(12) United States Patent
Sugimoto et al.

(10) Patent No.: US 7,591,177 B2
(45) Date of Patent: Sep. 22, 2009

(54) FLOW SENSOR AND MASS FLOW CONTROLLER USING THE SAME

(75) Inventors: Masato Sugimoto, Mie-ken (JP); Akifumi Hayashi, Mie-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/368,599

(22) Filed: Feb. 10, 2009

(65) Prior Publication Data

US 2009/0199633 A1 Aug. 13, 2009

(30) Foreign Application Priority Data

Feb. 12, 2008 (JP) ............................. 2008-029884

(51) Int. Cl.
*G01F 1/68* (2006.01)
(52) U.S. Cl. .................................. 73/204.27
(58) Field of Classification Search ............. 73/204.27, 73/204.26, 204.25
See application file for complete search history.

(56) References Cited

U.S. PATENT DOCUMENTS 5,080,131 A * 1/1992 Ono et al. .............. 137/599.11
5,209,113 A * 5/1993 Sawada et al. ............. 73/202.5
6,886,401 B2 * 5/2005 Ito et al. ....................... 73/202
7,131,456 B2 * 11/2006 Kang et al. ............... 137/487.5

FOREIGN PATENT DOCUMENTS

JP 03-017226 Y2 4/1991
JP 11-101673 A 4/1999

* cited by examiner

*Primary Examiner*—Jewel Thompson
(74) *Attorney, Agent, or Firm*—Arent Fox LLP

(57) ABSTRACT

A low cost, compact, high performance flow sensor that can be made small in size even for use in a large flow rate and a mass flow controller using the same are provided. The flow sensor includes a bypass passage, a sensor passage, and a bridge circuit including heat-generating resistance wires that constitute a part of the bridge circuit and are wound around the sensor passage. The flow sensor determines a total flow rate of a fluid that flows in a branched manner through the bypass passage and the sensor passage at a predetermined flow ratio. The total flow rate is determined by detecting, as an unbalance of the bridge circuit, heat transfer caused by the fluid flowing through the sensor passage and is outputted as a sensor output of the flow sensor. In the flow sensor, the bypass passage includes a plurality of fine flow passages each having a cross-section defined by a substantially linear edge and a curve in contact with the substantially linear edge. The ratio of the equivalent hydraulic diameter (d) of the fine flow passages to the common logarithm of the length (T) of the fine flow passages is 0.27 or less. The flow sensor is installed in the mass flow controller.

3 Claims, 5 Drawing Sheets

FLOW SENSOR AND MASS FLOW CONTROLLER USING THE SAME

BACKGROUND OF THE INVENTION

The present invention relates to a flow sensor for measuring the mass flow rate of a fluid such as a gas flowing at a relatively small flow rate, and to a mass flow controller using the same.

Generally, to manufacture semiconductor products such as semiconductor integrated circuits, CVD and etching processes, for example, are repeatedly performed on semiconductor wafers using various semiconductor manufacturing device. In such cases, mass flow controllers are used because of the need to accurately control the feed rate of processing gas used in a small amount.

Next, the configuration of a general mass flow controller is described with reference of FIGS. 6 and 7. FIG. 6 is a schematic configuration diagram of an example of a conventional mass flow controller interposed in gas tubing, and FIG. 7 is a circuit diagram of a flow sensor of the mass flow controller.

As shown in the figures, the mass flow controller 2 is interposed in a passage of a fluid such as a liquid or gas (for example, gas tubing 4) to control the mass flowrate of the fluid. A semiconductor manufacturing device connected to one end of the gas tubing 4 is maintained, for example, at a vacuum. This mass flow controller 2 includes a flow passage 6 formed of, for example, stainless steel, and the opposite ends of the flow passage 6 are connected to the gas tubing 4. The mass flow controller 2 includes a flow sensor unit 8 disposed on the upstream side of the flow passage 6 and a flow control valve mechanism 10 disposed on the downstream side.

The flow sensor unit 8 includes a bypass assembly 12 disposed in the flow passage 6 on the upstream side of the flow of the gas fluid and produced by bundling a plurality of bypass tubes. A sensor tube 14 is connected to the opposite end sides of the bypass assembly 12 so as to make a detour around the bypass assembly 12. The sensor tube 14 allows a smaller amount of the gas fluid to flow therethrough than through the bypass assembly 12 while the ratio of the flowing amounts is held constant. More specifically, the sensor tube 14 is configured such that the ratio of the gas flowing therethrough to the total flow of the gas is always held constant. A pair of resistance wires R1 and R4 connected in series for control use are wound around the sensor tube 14, and a flow signal S1 indicating a mass flow rate is outputted through a sensor circuit 16 connected to the resistance wires R1 and R4.

The flow signal S1 is introduced into mass flow control means 18 including, for example, a microcomputer. In the mass flow control means 18, the mass flow rate of the currently flowing gas is determined based on the flow signal S1, and the flow control valve mechanism is controlled such that the determined mass flow rate becomes coincident with the mass flow rate represented by a flow setting signal Sin inputted from the outside. The flow control valve mechanism 10 includes a flow control valve 20 disposed on the downstream side of the flow passage 6. The flow control valve 20 includes a bendable diaphragm 22 made of, for example, a metal plate. Such diaphragm 22 serves as a valve element for directly controlling the mass flow rate of the gas fluid.

The flow control valve 20 is configured such that the opening degree of a valve port 24 can be optionally controlled by appropriately bending and deforming the diaphragm 22 towards the valve port 24. The upper surface of the diaphragm 22 is connected to the lower end of an actuator 26 composed of, for example, a laminated piezoelectric element, so that the opening degree of the valve can be controlled as described above. The actuator 26 is driven by a valve driving voltage S2 outputted from a valve drive circuit 28 in response to a driving signal from the mass flow control means 18.

A relationship between the resistance wires R1 and R4 and the sensor circuit 16 is shown in FIG. 7. Namely, a series connection circuit of two reference resistors R2 and R3 is connected in parallel to the series connection of the resistance wires R1 and R4, so as to form a so-called bridge circuit. A constant power supply 30 for applying a constant current is connected to the bridge circuit. In addition, a differential circuit 32 is provided, and the connection point of the resistance wires R1 and R4 and the connection point of the reference resistors R2 and R3 are connected to the input side of the differential circuit 32. The differential circuit 32 determines a potential difference between the two connection points and outputs the determined potential difference as the flow signal S1.

The resistance wires R1 and R4 are made of a material having a resistance which varies with temperature. The resistance wire R1 is wound on the upstream side of the gas flow, and the resistance wire R4 is wound on the downstream side thereof. The reference resistors R2 and R3 are kept at a substantially constant temperature.

In the mass flow controller 2 having the above configuration, when no gas fluid flows through the sensor tube 14, the bridge circuit is in equilibrium since the temperatures of the resistance wires R1 and R4 are the same. Therefore, the potential difference (the detection value of the differential circuit 32) is, for example, zero.

Assuming that the gas fluid flows through the sensor tube 14 at mass flowrate Q, then this gas fluid is heated by the heat generated by the resistance wire R1 located on the upstream side, and the heated gas fluid flow reaches the region around which the downstream side resistance wire R4 is wound. Accordingly, heat transfer occurs, and a temperature difference is generated between the resistance wires R1 and R4. In other words, a difference in resistance is generated between the resistance wires R1 and R4, and the generated potential difference is approximately proportional to the mass flow rate of the gas. Therefore, the mass flow rate of the flowing gas can be determined by multiplying the flow signal S1 by a predetermined gain. The opening degree of the flow control valve 20 is controlled using, for example, the PID control method such that the detected mass flow rate of the gas becomes coincident with the mass flow rate represented by the flow setting signal Sin (in actuality a voltage value).

As described above, the flow sensor unit 8 includes the bypass assembly 12 composed of a plurality of fine tubes and the sensor tube 14 detouring around the bypass assembly 12. In addition, the flow ratio of the diverted flow through the sensor tube 14 to the flow through the bypass assembly 12 is kept constant, and the total flow rate is measured using the flow rate detected in the sensor tube 14. Therefore, by increasing or decreasing the number of bypass tubes, the flow ratio of the diverted flow through the sensor tube 14 can be changed, whereby the flow sensor can cover a wide range extending from a small flow rate to a large flow rate. However, a flow sensor for a higher flow rate requires a larger number of fine tubes (for example, several hundred fine tubes). Disadvantageously, as the number of fine tubes increases, the size of the flow sensor will also increase, thus undesirably increasing the cost of producing the bypass assembly.

In view of the above problems, Japanese Examined Utility Model Application Publication No. Hei 3-17226 (in particular, on pages 1 to 3) has suggested a laminar flow element secured inside a sleeve. The laminar flow element includes a core concentrically inserted into the sleeve, with flat and corrugated plates being wound around the core. This laminar flow element serves as a reliable laminar flow bypass easy to manufacture at low cost. Further, Japanese Patent Application Laid-Open No. Hei 11-101673 (in particular, on pages 2 to 3 and in FIG. 4) discloses a laminar flow element including a first strip-like body having a plurality of ribs protruding from its surface and a flat second strip-like body that are wound into a tubular shape.

However, in the technology described in Japanese Examined Utility Model Application Publication No. Hei 3-17226, the inlet of a sensor pipe must be located such that an inlet length sufficient for developing a laminar flow is provided on the upstream side. As a result, it is difficult to achieve a size reduction. In addition, to change the measurable flow rate range (hereinafter referred to as flow rate range), the height and pitch of the corrugations of the corrugated plate must be changed. Therefore a different corrugated plate must be used for a different flow rate range, and this results in an increase in cost.

In Japanese Patent Application Laid-Open No. Hei 11-101673, the laminar flow element must be increased in length in order to obtain a linearity between the rate of flow through the laminar flow element and an output signal. As a result, the size of the mass flow controller increases.

SUMMARY OF THE INVENTION

The present invention has been accomplished in view of the above problems, and it is an object of the invention to provide a low cost, compact, high performance flow sensor that can be small in size even when used for a large flow rate and to provide a mass flow controller using the same.

A first aspect of the present invention provides a flow sensor including a bypass passage, a sensor passage, and a bridge circuit including heat-generating resistance wires that constitute a part of the bridge circuit and are wound around the sensor passage, the flow sensor determining a total flow rate of a fluid that flows in a branched manner through the bypass passage and the sensor passage at a predetermined flow ratio, the total flow rate being determined by detecting, as an unbalance of the bridge circuit, heat transfer caused by the fluid flowing through the sensor passage, the total flow rate being outputted as a sensor output of the flow sensor. The flow sensor is characterized in that the bypass passage includes a plurality of fine flow passages each having a cross-section defined by a substantially linear edge and a curve in contact with the substantially linear edge and that a ratio of an equivalent hydraulic diameter (d) of the fine flow passages to a common logarithm of a length (T) of the fine flow passages is 0.27 or less.

When the curve is represented by y=f(x) and is in contact with the edge at two points $\underline{a}$ and $\underline{b}$, the length of the curve is represented by Equation 1.

$$l = \int_a^b \sqrt{1+\{f'(x)\}^2}\,dx \quad \text{[Equation 1]}$$

Therefore, the peripheral length L of the fine flow passage surrounded by the curve and the substantially linear edge is represented by Equation 2.

$$L = l + (b-a) \quad \text{[Equation 2]}$$

The cross-sectional area S of the fine flow passage surrounded by the curve and the substantially linear edge is represented by Equation 3.

$$S = \int_a^b f(x)\,dx \quad \text{[Equation 3]}$$

The fine flow passages are configured such that the following Equation (Inequality) 4 holds.

$$\frac{d}{\log(T)} < 0.27 \quad \text{[Equation 4]}$$

Here, $\underline{d}$ is the equivalent hydraulic diameter defined as $d = 4 \times S/L$, and T is the length of the fine flow passages.

In the above configuration, the bypass passage includes a plurality of fine flow passages satisfying Equation 4. In this manner, a rectifying effect on the fluid flowing through the bypass passage is improved, and the length of the bypass passage can thereby be reduced. Therefore, the flow sensor can be made compact in size. In addition, a mass flow controller using the above flow sensor can be made compact in size even when used for a large flow rate and can be manufactured at low cost.

In a second aspect of the invention, the fine flow passages are preferably formed by winding a flat plate and a corrugated plate, and the corrugated plate has a substantially sinusoidal cross-section. The present invention also provides a mass flow controller including the flow sensor of the first or second aspect.

With the flow sensor of the present invention and the mass flow controller using the same, the following effects can be obtained.

Since the bypass passage includes a plurality of fine flow passages satisfying Equation 4, the rectifying effect on the fluid flowing through the bypass passage is improved, and the length of the bypass passage can thereby be reduced. Therefore, the flow sensor can be made compact in size. In addition, the mass flow controller using the above flow sensor can be made compact in size even when used for a large flow rate and can be manufactured at low cost.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Hereinafter, an embodiment of a flow sensor according to the present invention and a mass flow controller using the same are described with reference to the accompanying drawings.

Figure 1:
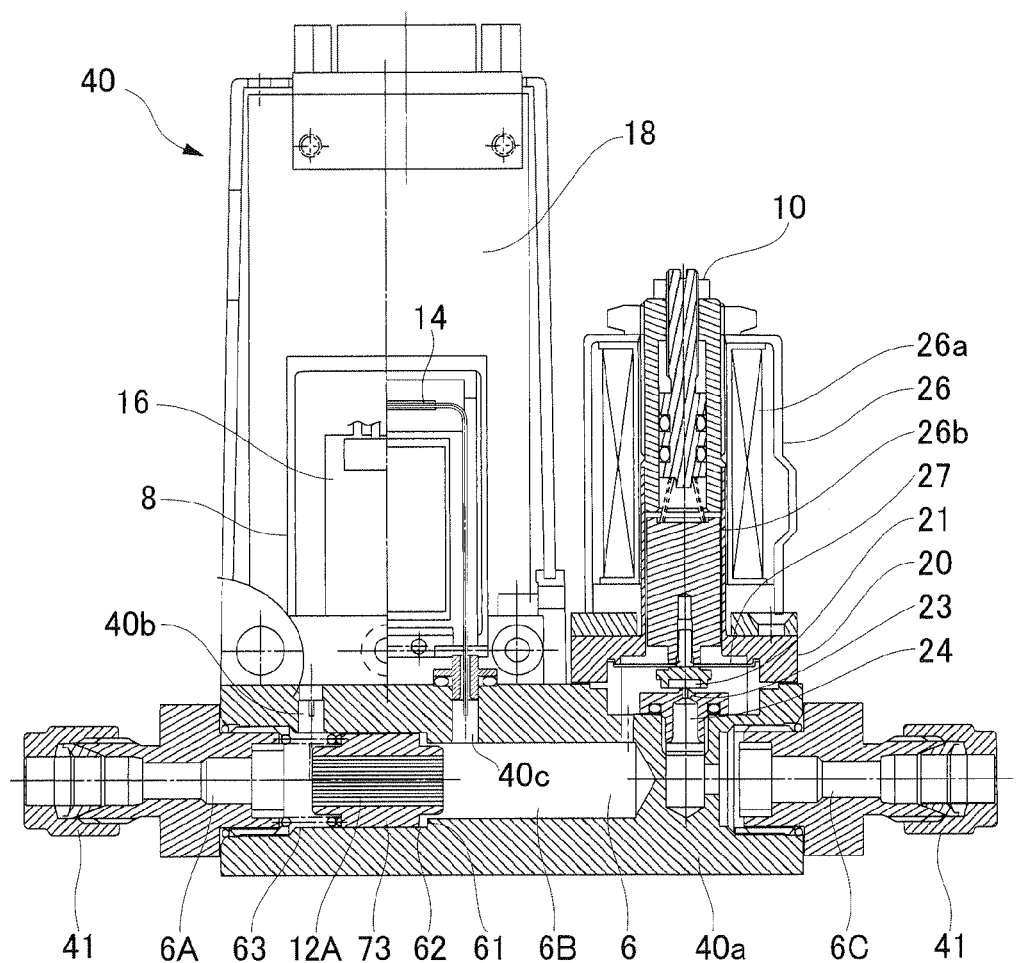
FIG. 1 is a cross-sectional view showing an exemplary mass flow controller according to the present invention.
Figure 6:
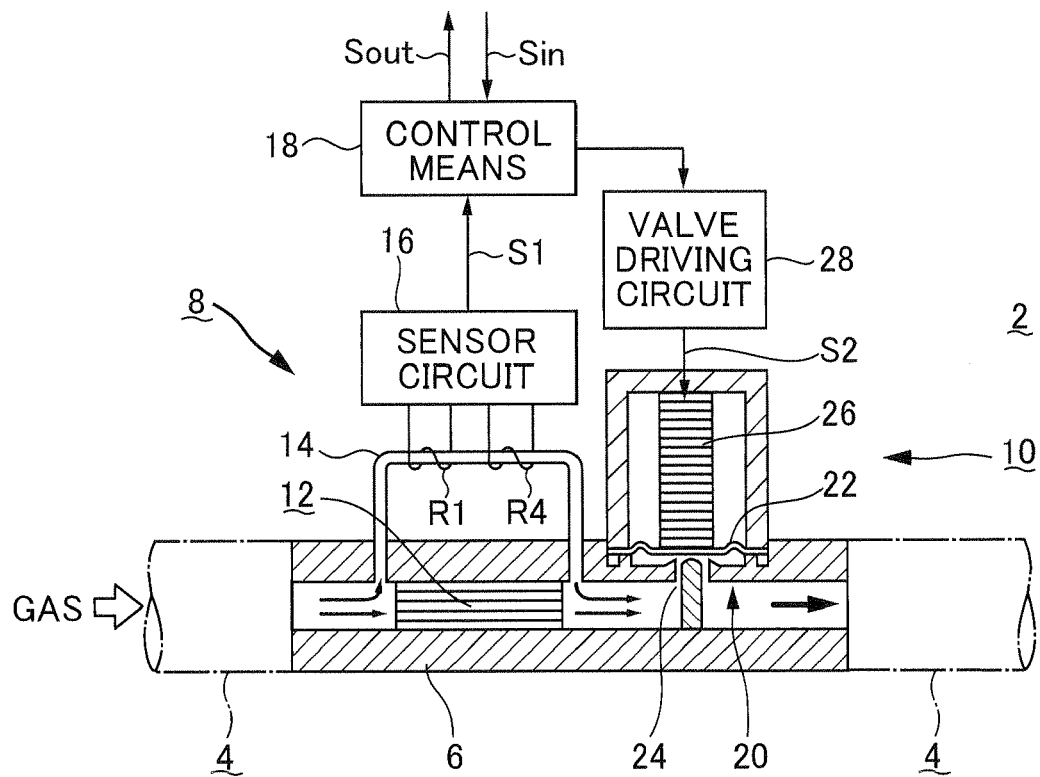
FIG. 6 is a schematic configuration diagram showing an example of a conventional mass flow controller interposed in gas tubing.
Figure 7:
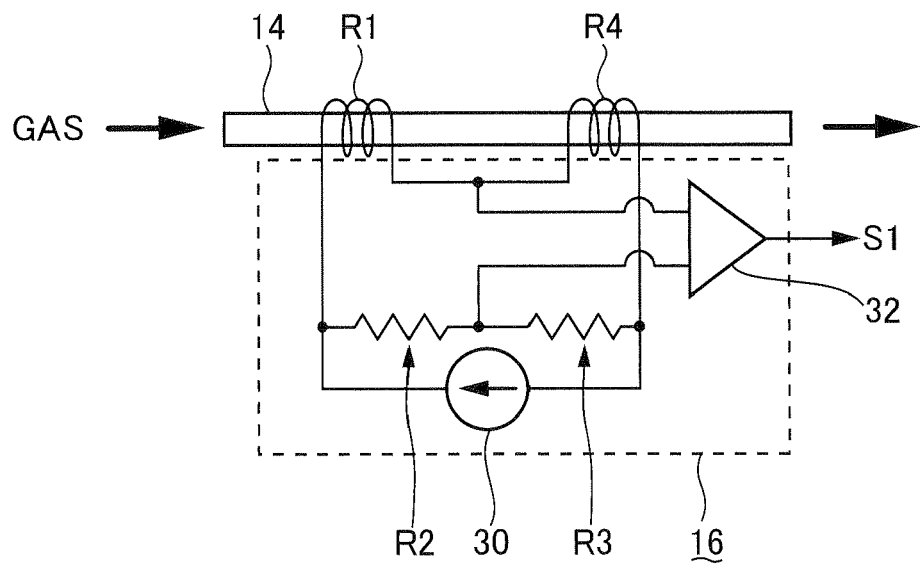
FIG. 7 is a circuit diagram of a flow sensor unit of the mass flow controller.

FIG. 1 is a cross-sectional view of an exemplary mass flow controller according to the present invention. The same elements as those shown in FIGS. 6 and 7 are denoted by the same reference numerals, and the description thereof will be omitted.

As shown in FIG. 1, a mass flow controller 40 is connected to a passage of a fluid such as a liquid or gas through joint portions 41 and controls the mass flow rate (which hereinafter may be simply referred to as a "flow rate") of the fluid. A semiconductor manufacturing device connected to one end of one of the joint portions 41 is maintained, for example, at a vacuum. More specifically, the mass flow controller 40 includes a main body 40a made of, for example, stainless steel and a flow passage 6 formed inside the main body 40a. A flow sensor unit 8 is disposed between a fluid inlet 6A and an intermediate flow passage 6B, and a flow control valve mechanism 10 is disposed between the intermediate flow passage 6B and a fluid outlet 6C.

The flow sensor unit 8 includes a bypass assembly 12A, a sensor tube 14, a sensor circuit 16, and the like. A flow signal S1 detected by the flow sensor unit 8 is outputted to mass flow control means 18.

The bypass assembly 12A includes a cylindrical bypass holder 73 containing a corrugated plate 70 and a flat plate 71 wound together (described later). The bypass assembly 12A is pressed from its inlet side by a spring 63 and secured through a seal ring 62 to a step portion 61 formed inside the flow passage 6 so as to hermetically seal one end of the bypass holder 73.

The sensor tube 14 is a narrow tube having an inner diameter of about 0.5 mm and is connected to the flow passage 6 of the main body 40a through branching holes 40b and 40c formed on the upstream and downstream sides of the bypass assembly 12A.

The flow control valve mechanism 10 includes a flow control valve 20 and an actuator 26 for driving the flow control valve 20.

The flow control valve 20 can operate to control an opening degree between a valve seat 23 (having a valve port 24 and screwed into the main body 40a) and a valve element 21 facing the valve seat 23.

The actuator 26 includes a magnetic coil 26a and a plunger 26b vertically movable by the magnetic coil 26a. The lower end of the plunger 26b is connected to the valve element 21 through a flat spring 27.

The flow control valve mechanism 10 is a so-called normally open flow control valve. Namely, when the magnetic coil 26a is not energized, the valve seat 23 and the valve element 21 are separated from each other by the flat spring 27.

The mass flow control means 18 directly applies a valve driving voltage S2 to the magnetic coil 26a. The magnetic coil 26a is energized by the valve driving voltage S2 so that a downward electromagnetic force is applied to the plunger 26b. The flat spring 27 exerts an elastic force against the downward electromagnetic force and drives the valve element 21 to a position at which the electromagnetic force and the elastic force are balanced, thus adjusting the opening degree of the valve.

The mass flow control means 18 controls the opening degree of the flow control valve 20 by, for example, the PID control method such that the flow rate represented by a flow setting signal S0 inputted to the mass flow control means 18 from an outside device such as a host computer becomes coincident with the flow rate represented by the flow signal S1. In the exemplary configuration shown in FIG. 1, the flow control valve mechanism 10 is disposed on the downstream side of the flow sensor unit 8. However, the flow control valve mechanism 10 can also be disposed on the upstream side of the flow sensor unit 8.

Of course, the actuator 26 is not limited to the magnetic coil 26a, but may include a laminated piezoelectric element such as described above.

Figure 2:
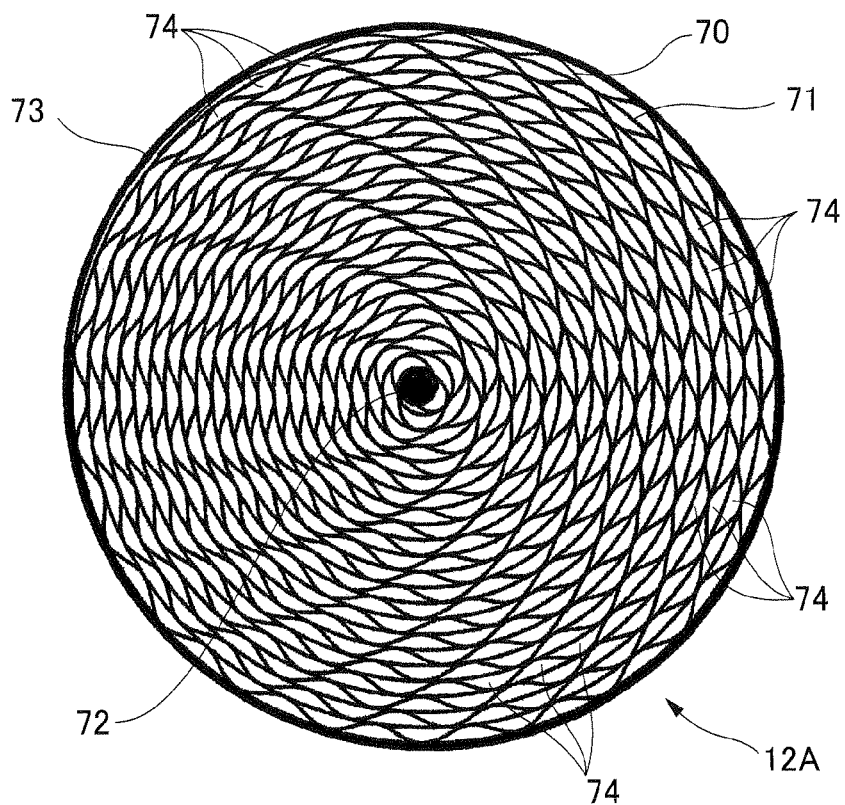
FIGS. 2(a) and 2(b) are cross-sectional views of bypass assemblies, FIG. 2(a) being a front view showing an Example of the present invention, FIG. 2(b) being a front view showing a Comparative Example.
Figure 2:
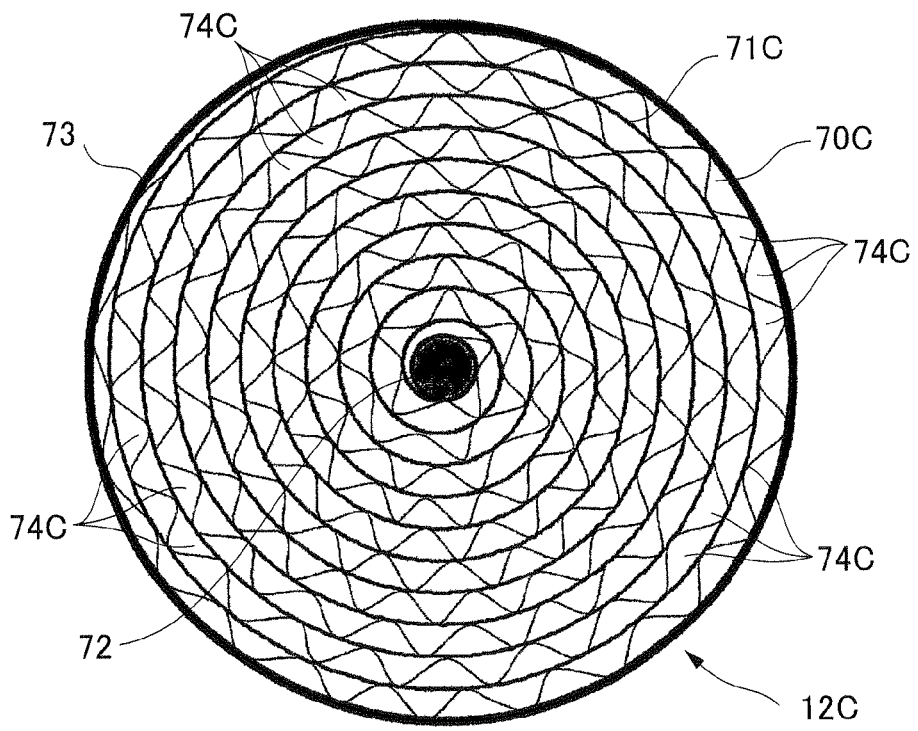
Figure 3:
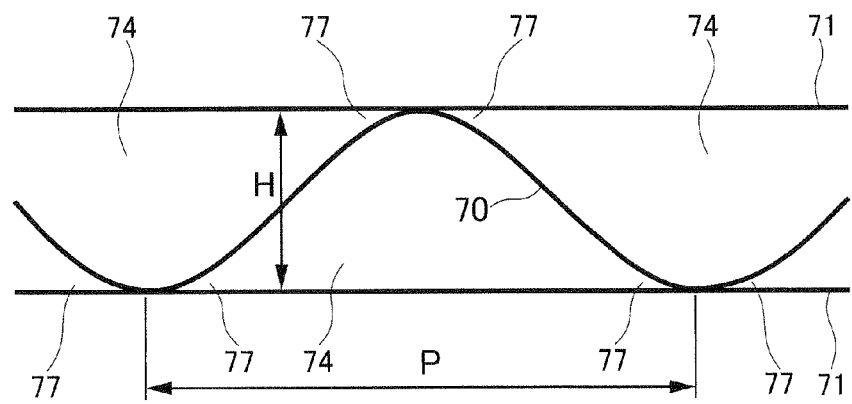
FIG. 3 is a partially enlarged view of FIG. 2(a)
Figure 4:
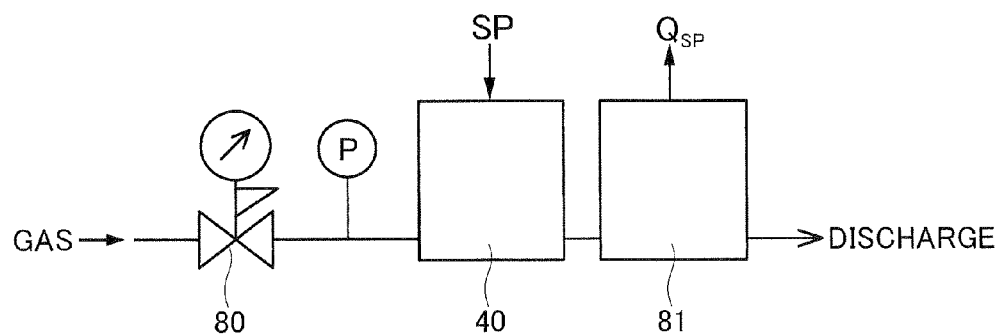
FIG. 4 is a schematic view of an apparatus used for comparison tests between the Examples and the Comparative Example.

An embodiment of the bypass assembly will now be described with reference to the accompanying drawings. FIGS. 2(a) and 2(b) are cross-sectional views of bypass assemblies. FIG. 2(a) is a cross-sectional view showing an Example of the present invention, and FIG. 2(b) is a cross-sectional view showing a Comparative Example. FIG. 3 is a partially enlarged view of FIG. 2(a), and FIG. 4 is a schematic view of an apparatus used for a comparison test between the Examples and the Comparative Example. FIGS. 5(a) to 5(e) are graphs showing the linearity relationships between the flow rates and the flow rate signals in the Examples and the Comparative Example.

As shown in FIG. 2(a), the bypass assembly 12A includes: a corrugated plate 70 made of, for example, a stainless steel thin plate having a thickness of 0.03 mm and formed to have a substantially sinusoidal cross-section with a pitch P=1.68 mm and a height H=0.25 mm; a flat plate 71 made of stainless steel; and a tubular bypass holder 73 having an inner diameter $\phi$ of 15.4 mm and containing the corrugated plate 70 and the flat plate 71 wound together around a cylindrical core 72. Spaces surrounded by the corrugated plate 70 and the flat plate 71 and formed at a density of 2,500 cells/inch$^2$ serve as fine flow passages 74 that extend in the axial direction (perpendicular to the plane of the figure).

As shown in FIG. 3, each of the fine flow passages 74 includes narrow portions 77 formed in proximity to points at which the corrugated plate 70 is in contact with the flat plate 71. An area in contact with the fluid (corresponding to the peripheral length of the fine flow passage 74 shown in FIG. 3) is larger than the cross-sectional area of the fine flow passage 74 through which the fluid flows. In such a case, the fluid receives large frictional resistance from the walls of the fine flow passages 74. This may cause a flow laminarization effect, and therefore the flow ratio of the diverted flow through the sensor tube 14 to the flow through the bypass assembly 12A may be stabilized. The corrugated plate 70 is not limited to a sinusoidal cross-section, so long as it, together with the flat plate 71, forms the narrow portions 77, which, however, are not formed by a rectangular or triangular cross-section. The corrugated plate 70 may have a corrugated cross-section formed by continuously connecting semi-circular shapes or a corrugated cross-section formed by continuously connecting parts of two or three dimensional curves.

On the other hand, as shown in FIG. 2(b), in the Comparative Example, a bypass assembly 12C includes fine flow passages 74C having a substantially regular triangular cross-section. Each of the fine flow passages 74C is surrounded by a flat plate C and a corrugated plate 70C formed by shaping a stainless steel thin plate having a thickness of 0.03 mm into a substantially sinusoidal cross-section with a pitch P=1.68 mm and a height H=0.4 mm. The area in contact with the fluid is small. As a result, the flow laminarization effect is also small.

EXAMPLES

The bypass assemblies 12A shown in FIG. 2(a) and a bypass assembly 12C shown in FIG. 2(b) were installed in mass flow controllers 40, respectively. As shown in FIG. 4, a pressure control valve 80, the mass flow controller 40, and a mass flow meter 81 calibrated in advance were disposed in series. While a gas at a constant pressure was supplied from the upstream side at a maximum flow rate of 10 SLM, a linearity during each mass flow control was determined for each mass flow controller 40, and the results were compared.

Nitrogen gas of 0.05 MPa was used as a processing gas, and a mass flow rate $Q_{SP}$ was measured using the mass flow meter 81 when a flow setting signal SP sent to the mass flow controller 40 was sequentially changed from 20% of a maximum flow rate (full scale flow rate) $Q_{FS}$ to 100% of the maximum flow rate $Q_{FS}$.

The graphs shown in FIGS. 5(a) to 5(e) compare the linearity relationships between the flow rates and the flow rate signals in several Examples and a Comparative Example and show the flow laminarization effects provided by the bypass assemblies 12A shown in FIG. 2(a) and the bypass assembly 12C shown in FIG. 2(b).

The horizontal axis SP represents the ratio with respect to the maximum flow rate (full scale flow rate) $Q_{FS}$, while the linearity on the vertical axis is a value computed by substituting the measured mass flow rate $Q_{SP}$ in the following equation 5:

$$\text{Linearity}(\%F.S.) = \frac{Q_{SP} - \frac{Q_{FS} \times SP}{100}}{Q_{FS}} \times 100 \quad \text{[Equation 5]}$$

Figure 5:
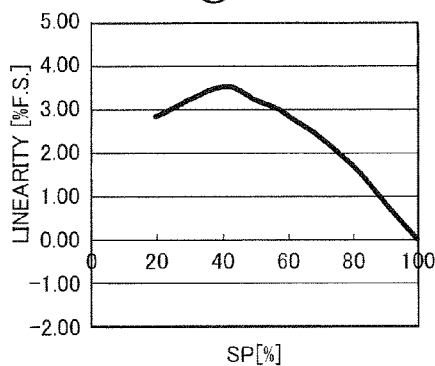
FIGS. 5(a) to 5(e) are graphs for comparing the linearity relationships between the flow rates and flow rate signals in the Examples and the Comparative Example.
Figure 5:
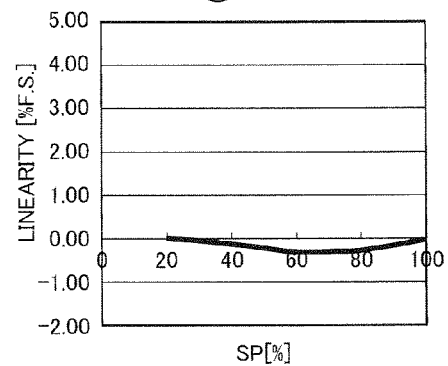
Figure 5:
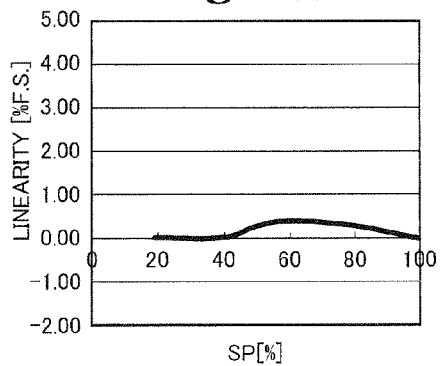
Figure 5:
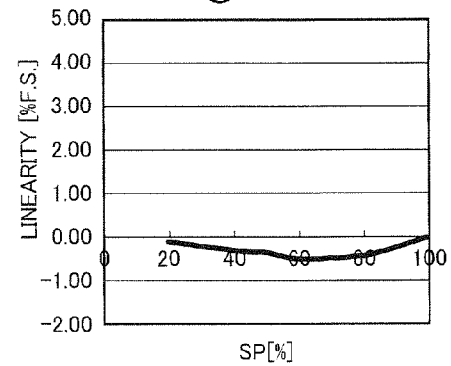
Figure 5:
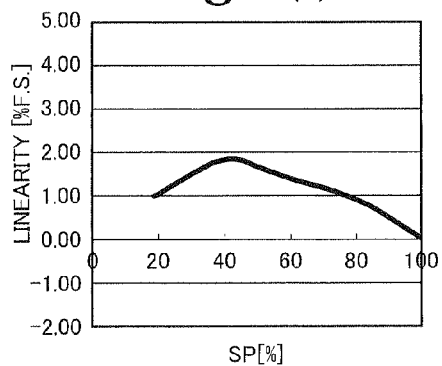

$Q_{sp}$: Measured mass flow rate $Q_{fs}$: The maximum flow rate of the mass flow controller SP: The ratio with respect to the maximum flow rate (full scale flow rate) $Q_{FS}$ FIG. 5(a) shows experimental results using the bypass assembly 12C (Comparative Example) shown in FIG. 2(b). FIGS. 5(b) to 5(e) show experimental results using the bypass assemblies 12A (Examples) shown in FIG. 2(a) in which a corrugated plate having a substantially sinusoidal cross-section and a flat plate are wound so as to have an outer diameter φ of 15.4 mm. The shape of each bypass assembly 12A is shown in Table 1.

TABLE 1

| | Experimental results | Pitch (P) of corrugated plate | Height (H) of corrugated plate | Unit: mm Length (T) of fine flow passages |
|---|---|---|---|---|
| Comparative Example | FIG. 5(a) | 1.68 | 0.4 | 24 |
| Example 1 | FIG. 5(b) | 1.68 | 0.3 | 24 |
| Example 2 | FIG. 5(c) | 1.68 | 0.3 | 16 |
| Example 3 | FIG. 5(d) | 1.68 | 0.25 | 16 |
| Example 4 | FIG. 5(e) | 1.68 | 0.25 | 8 |

As can be seen by comparing the results shown in FIGS. 5(a) and 5(b), the linearity around SP=40' was approximately 3.5% in FIG. 5(a), while the linearity shown in FIG. 5(b) was good, i.e., not exceeding 0.5% at any flow rate in the SP range of 20 to 100.

As shown in FIG. 5(c), even when the length (T) of the fine flow passages is set to 16 mm, the flow laminarization effect was hardly affected, thereby ensuring an acceptable linearity.

As shown in FIG. 5(d), even in Example 3, a good linearity was obtained. In Example 4 shown in FIG. 5(d), the linearity was slightly under 2% around SP=40%. However, this hardly affects the practical accuracy of the flow sensor.

A discussion will now be conducted based on Equations 1 to 4.

In each of the Examples and the Comparative Example, a corrugated plate having a sinusoidal cross-section was used. The values of d/log(T) computed by substituting the values shown in Table 1 in Equations 1 to 4 are shown in Table 2.

TABLE 2

| | Equivalent hydraulic diameter (d) | d/log (T) |
|---|---|---|
| Comparative Example 1 | 0.376 | 0.272 |
| Example 1 | 0.289 | 0.210 |
| Example 2 | 0.289 | 0.240 |
| Example 3 | 0.244 | 0.202 |
| Example 4 | 0.244 | 0.269 |

As can be seen, when the value of d/log(T) is 0.27 or less, the length of the bypass passage can be reduced, and a compact flow sensor can be produced. This may be because the fluid receives a large frictional resistance from the walls of the fine flow passages 74, producing the flow laminarization effect and thus stabilizing the flow ratio of the diverted flow through the sensor tube 14 to 10 the flow through the bypass assembly 12A.

Comparison tests were conducted under gas pressures of 0.1 MPa to 0.3 MPa using He and $SF_6$ gases. Similar to the above results, the flow laminarization effect was found to be greater in the bypass assemblies 12A than in the bypass assembly 12C. Therefore, a compact is mass flow controller with a maximum flow rate of 39 SLM can be provided by installing a flow sensor using the bypass assembly 12A.

When a flow sensor with a higher accuracy is required, it is preferable to set d/log(T) at 0.24 or less. On the other hand, since a lower d/log(T) will cause a larger pressure loss of the fluid, the lower limit of d/log(T) should be set at about 0.15.

Although there are still some difficulties in manufacturing and a problem of pressure loss, it is allowed to consider that it is possible to produce a compact bypass assembly having a shorter fine flow passage length by bundling a plurality of solid wires and installing the bundled solid wires in a bypass holder, with spaces formed between the solid wires serving as fine flow passages.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A flow sensor comprising:

a bypass passage;

a sensor passage; and a bridge circuit including heat-generating resistance wires that constitute a part of the bridge circuit and are wound around the sensor passage, the flow sensor determining a total flow rate of a fluid that flows in a branched manner through said bypass passage and said sensor passage at a predetermined flow ratio, the total flow rate being determined by detecting, as an unbalance of said bridge circuit, heat transfer caused by said fluid flowing through the sensor passage, the total flow rate being outputted as a sensor output of the flow sensor, wherein said bypass passage includes a plurality of fine flow passages each having a cross-section defined by a substantially linear edge and a curve in contact with the substantially linear edge, and a ratio of an equivalent hydraulic diameter (d) of the fine flow passages to a common logarithm of a length (T) of the fine flow passages is 0.27 or less.

2. The flow sensor according to claim 1, wherein said bypass passage is configured by winding a flat plate and a corrugated plate to form said fine flow passages, and said corrugated plate has a substantially sinusoidal cross-section.

3. A mass flow controller comprising the flow sensor according to claim 1 or 2.

* * * * *